M. B. SHERWOOD.
Preserving Meat.
No. 85,485.
Patented Dec. 29, 1868.
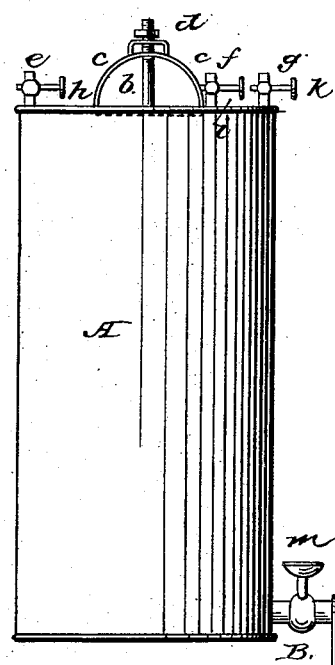
Fig. 1
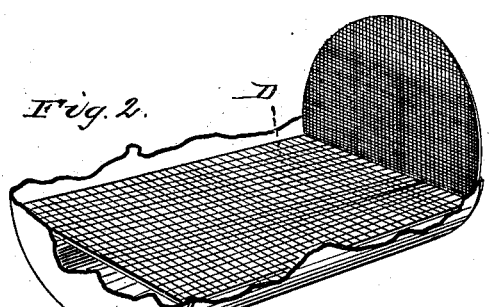
Fig. 2
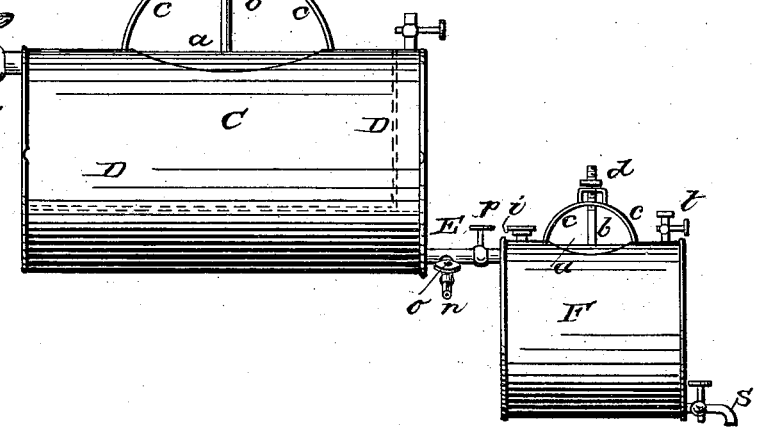
Witnesses:
Harry King
Leopold Coch
Inventor
M B Sherwood
per
Alexander Mason
Atty.

United States Patent Office.

MERRELL B. SHERWOOD, OF BUFFALO, NEW YORK.

Letters Patent No. 85,485, dated December 29, 1868.

IMPROVED PROCESS FOR CURING AND PRESERVING MEAT.

The Schedule referred to in these Letters Patent and making part of the same.

*To all whom it may concern:*

Be it known that I, MERRELL B. SHERWOOD, of the city of Buffalo, in the county of Erie, and in the State of New York, have invented a new and useful Improvement in Process for Curing and Salting Meat; and do hereby declare that the following is a full, clear, and exact description thereof, reference being had to the accompanying drawings, and to the letters of reference marked thereon.

The nature of my invention consists in the construction of tanks, or other suitable vessels, for the purpose of removing blood and other impurities from the meat, as well as opening its pores by means of suction, and curing it by the forcible injection of curative-substances in solution, which is accomplished by the means of compressed air.

It is a well-known fact, that, in hot climates, the decomposition of meat is so rapid as to prevent its being effectually cured by the ordinary processes, except by the very expensive means of ice; consequently, while hot climates are best adapted to raising animals, the trade in cured meats is almost wholly supplied from markets in cold latitudes, to which animals have to be taken from necessity, and at great expense, to be slaughtered.

By reason of there being no process known by which meats can be effectually cured in such hot climates, it is well known that animals are slaughtered there mainly for their hides, tallow, and fat.

The utility of my invention and process mainly consists in obviating this great difficulty, by providing an expeditious process, by which meat can be cured before decomposition commences.

By this process meats may be cured in large bodies, as in the quarter, which is not found practicable by the ordinary processes in use—a result valuable and desirable to the trade.

In order to enable others skilled in the art to make and use my invention, I will now proceed to describe its construction and operation, referring to the annexed drawings, which form a part of this specification, and in which—

Figure 1 is a side elevation of my apparatus; and
Figure 2 is a perspective of the grating placed in the meat-tank.

A represents a tank, made of boiler-iron, or other suitable material, of any desired shape and size.

This tank is placed in an upright position, and provided on its top side with a man-hole, which is closed by means of a strong plate, *a*, attached to a screw-rod, *b*, passing through a supporter, *c*, and fastened by means of a nut, *d*, as shown.

It is also provided with conducting and escape-tubes, *e*, *f*, and *g*, which are opened or closed by means of stop-cocks, *h*, *i*, and *k*.

From the side of the tank A, near its bottom, a conducting-pipe, B, leads into the upper part of the tank C, which is made, as described of tank A, but placed horizontally, and provided on its upper side with a man-hole, which is closed by a similar device to that described in tank A.

The connecting-tube B may be made, either in sections, or whole, and is provided with a stop-cock, *m*, so that they, the tanks A and C, can be shut off from each other.

The tanks A and C, made of any suitable material, as mentioned, should be sufficiently strong to withstand a powerful pressure from the inside, and they should be firmly placed, so that the bottom of tank A is not any lower than the top of the tank C, than sufficient to allow the conducting-pipe B to be placed, as described.

The tank C is provided on the inside with a grating, D, which is so placed as to cover its lower part, making, as it were, a false bottom, and extends also up on the side farthest from the tank A, as shown in the drawings.

From the lower part of the side of the tank C, farthest from the tank A, a pipe, E, connects it with another tank, F, which is so placed, that this pipe E enters it near its top.

The pipe E is provided on its side with an outlet, *n*, and stop-cock, *o*, and on its upper side with a valve or stop-cock, *p*, so that the two tanks C and F may be shut off from each other.

The tank F is provided with a similar device for closing its man-hole, as described, for the tanks A and C, and also with a stop-cock or valve, *r*, on its upper side, and a faucet, *s*, near its bottom.

This machine, being strongly built, and firmly placed, substantially as shown in the drawing, is ready for my process of curing meat, which is as follows:

The man-hole on tank A being closed, I introduce, through the conducting-pipes *f* or *g*, salt, saltpetre, or such other substance in solution, as it is desired to inject into the meat to be cured, in quantities more than sufficient to completely fill the tank C, after the meat is placed therein, and still the tank A should only be about two-thirds full. The tanks ought therefore to be made somewhat to correspond with these proportions.

The pipe B should, of course, be closed by means of the stop-cock *m*, before introducing the brine into tank A.

The meat to be cured is put into the tank C on the grating D, through its man-hole, which, after the tank is nearly filled with meat, is closed firmly by means of the plate *a*, rod *b*, and nut *d*, as before described.

All the openings to tanks C and F are then closed, so as to render them as air-tight as possible, the stop-cock *p* in the pipe E, connecting the two tanks, being left open.

To purify and open the pores of the meat placed in the horizontal tank C, preparatory to receiving the solution, a suction-pump is placed upon the tube *t* on top of the tank F. This suction-pump is then operated, until all the air is exhausted from the horizontal tank C, as well as from the receiving-tank F. The air being thus exhausted, the blood and impurities will drop into the receiving-tank F, through the pipe E, the grating D, placed in the tank C, preventing the meat from clogging or stopping up said pipe.

The draw-cock $p$ connecting the two tanks is then closed, and the stop-cock $r$ opened, admitting air.

The faucet $s$ is also opened to draw off the blood and other impurities.

The meat in the tank C is left in a pure state, to receive the solution with which it is to be impregnated.

I then attach an air-force pump to the tube $e$ on the tank A, and fill the space between the brine and the top of the tank with compressed air.

I then close the cock $h$ in said tube $e$, and, opening the stop-cock $m$ in the pipe B, throw the brine or solution with immense force into the tank C, thoroughly impregnating the meat—the brine to remain in said tank sufficient time to cure the meat. It is then drawn off through the outlet $n$, and the meat removed through the man-hole, to be packed, in the usual mode, in barrels.

I am aware that a process for curing meat, by a pressure under water first, and then pressure under the brine, has been patented. I do not use any water at all. My process is simply by suction of air; and furthermore, my invention consists mainly, as already stated, in the apparatus by which the process is accomplished.

Having thus fully described my invention,

What I claim as new, and desire to secure by Letters Patent, is—

1. The combination of the tanks A, C, and F, all constructed, as described, and operating substantially as and for the purposes herein set forth.

2. The within-described process of preparing meat for curing, by subjecting the same to the suction of an air-pump, whereby the blood and impurities are removed from the meat, and its pores opened, substantially as and for the purposes herein set forth.

In testimony that I claim the foregoing invention, I have hereunto set my hand, this 1st day of July, 1868.

MERRELL B. SHERWOOD.

Witnesses:
JOSEPH LEPH,
M. PINNER.